(12) United States Patent
Bae et al.

(10) Patent No.: US 11,454,930 B2
(45) Date of Patent: Sep. 27, 2022

(54) HOLOGRAPHIC IMAGE DISPLAY DEVICE

(71) Applicant: SK TELECOM CO., LTD., Seoul (KR)

(72) Inventors: Yong Woo Bae, Seoul (KR); Dongyoub Sinn, Seoul (KR); Hak-Soon Lee, Seoul (KR); Jinsoo Jeon, Seoul (KR); Gukchan Lim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 274 days.

(21) Appl. No.: 16/757,721

(22) PCT Filed: Oct. 19, 2018

(86) PCT No.: PCT/KR2018/012404
§ 371 (c)(1),
(2) Date: Apr. 20, 2020

(87) PCT Pub. No.: WO2019/078670
PCT Pub. Date: Apr. 25, 2019

(65) Prior Publication Data
US 2021/0200151 A1 Jul. 1, 2021

(30) Foreign Application Priority Data

Oct. 20, 2017 (KR) .................. 10-2017-0136878

(51) Int. Cl.
*G03H 1/22* (2006.01)
(52) U.S. Cl.
CPC ........... *G03H 1/22* (2013.01); *G03H 2223/19* (2013.01); *G03H 2223/24* (2013.01); *G03H 2240/51* (2013.01)

(58) Field of Classification Search
CPC .. G03H 1/22; G03H 2223/19; G03H 2223/24; G03H 2240/51; G03H 1/2294;
(Continued)

(56) References Cited

U.S. PATENT DOCUMENTS 5,706,108 A 1/1998 Ando et al.
6,481,851 B1 * 11/2002 McNelley .............. G03B 15/10
359/488.01
(Continued)

FOREIGN PATENT DOCUMENTS

| JP | 9-33853 A | 2/1997 | |
|---|---|---|---|
| JP | 2010-079236 A | 4/2010 | |
| JP | 2014-071344 A | 4/2014 | |
| KR | 10-1597628 B1 | 2/2016 | |
| KR | 10-2017-0039526 A | 4/2017 | |
| WO | WO-2016181139 A1 * | 11/2016 | .............. A47F 11/06 |

OTHER PUBLICATIONS

"https://m.v.qq.com/play.html?vid=z0119mw8nr2", 3D Holographic Projection, Oct. 22, 2013.
(Continued)

*Primary Examiner* — Kimberly N. Kakalec
(74) *Attorney, Agent, or Firm* — Hauptman Ham, LLP

(57) ABSTRACT

A holographic image display device according to one embodiment comprises: an image display unit on which a holographic image is displayed; and a spatial impression providing unit which forms a space surrounding the holographic image, and includes a transparent color material such that the space looks colored and the holographic image can be recognized from the outside.

9 Claims, 9 Drawing Sheets

(58) Field of Classification Search
CPC ....... G03H 2001/2221; G03H 2223/15; G03H 1/2205; G03H 1/0443; G03H 2001/221; G03H 2223/18; G02B 5/045; G02B 30/60; G02B 1/11; G02B 27/0018; G02B 30/40; G02B 5/223; G03B 21/56; G03B 21/602; G03B 21/62; H04N 9/3141
See application file for complete search history.

(56) References Cited

U.S. PATENT DOCUMENTS

| | | |
|---|---|---|
| 2010/0073276 A1 | 3/2010 | Koike et al. |
| 2011/0037952 A1* | 2/2011 | LaDuke ................. G03B 21/26 353/28 |

OTHER PUBLICATIONS

Chinese Office Action dated Feb. 19, 2021, in connection with corresponding Chinese Patent Application No. 201880066166.X, citing the above references.
International Search Report dated Jan. 28, 2019, in connection with counterpart International Patent Application No. PCT/KR2018/012404, citing the above references.
Mashable, 'Holographic 3D Projection Device 'Voxiebox' Showcases Futuristic Display Tech | Mashable', YouTube, Sep. 5, 2015 (https://www.youtube.com/watch?v=pzh382EF3ik).

* cited by examiner

HOLOGRAPHIC IMAGE DISPLAY DEVICE

CROSS-REFERENCE TO RELATED APPLICATION

The present application is a national stage filing under 35 U.S.C § 371 of PCT application number PCT/KR2018/012404 filed on Oct. 19, 2018 which is based upon and claims the benefit of priorities to Korean Patent Application No. 10-2017-0136878, filed on Oct. 20, 2017, in the Korean Intellectual Property Office. The disclosures of the above-listed applications are hereby incorporated by reference herein in their entireties.

TECHNICAL FIELD

The present disclosure relates to a holographic image display device.

BACKGROUND

A hologram is a recording of interference patterns of light such as laser light on a recording medium such as a film or a photosensitive dry plate. The hologram provides a stereoscopic image of an object. For example, a hologram of a person's head provides different images depending on the viewing position. That is, the left side of the person's head is seen in a position, the front side of the person's head is seen in another position and the right side of the person's head is seen in still another position.

Meanwhile, a pseudo hologram refers to a technique that produces a hologram-like effect, although it is not the hologram itself. In the pseudo hologram, a half-mirror film type screen or a transmissive screen may be employed.

However, when the half-mirror film type screen is employed, the screen should be arranged to be inclined at an angle of about 45 degrees. In this case, the volume of such a holographic image display device is increased compared to the volume of a holographic image display device that does not employ the half-mirror film type screen.

In addition, the degree of freedom of configuration in which the half-mirror film type screen is employed is lower than that of the holographic image display device which does not employ the half-mirror film type screen. Meanwhile, when employing a transmissive screen, the screen should be transparent. In this case, when the ambient illumination is high, the holographic image is not seen clearly.

SUMMARY

In view of the above, the present disclosure provides a holographic image display device capable of clearly providing a pseudo holographic image.

It is to be understood, however, that the object of the present disclosure is not limited to those mentioned above. Other objects not mentioned above will be clearly understood by those skilled in the art from the following description.

In accordance with an aspect of the present disclosure, there is provided a holographic image display device comprising: an image display unit configured to display a holographic image; and a spatial impression providing unit configured to form a space surrounding the holographic image, the spatial impression providing unit comprising a colored transparent material which allows the holographic image to be seen through the spatial impression providing unit from outside while allowing the space to be seen colored.

In accordance with the embodiment of the present disclosure, since the background of the holographic image can be seen colored, the observer can clearly recognize the holographic image even when the ambient illumination is bright.

Further, the ghost phenomenon can be reduced or eliminated.

In addition, it is possible to provide a holographic image with a wider viewing angle than that in the conventional case.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

Figure 1:
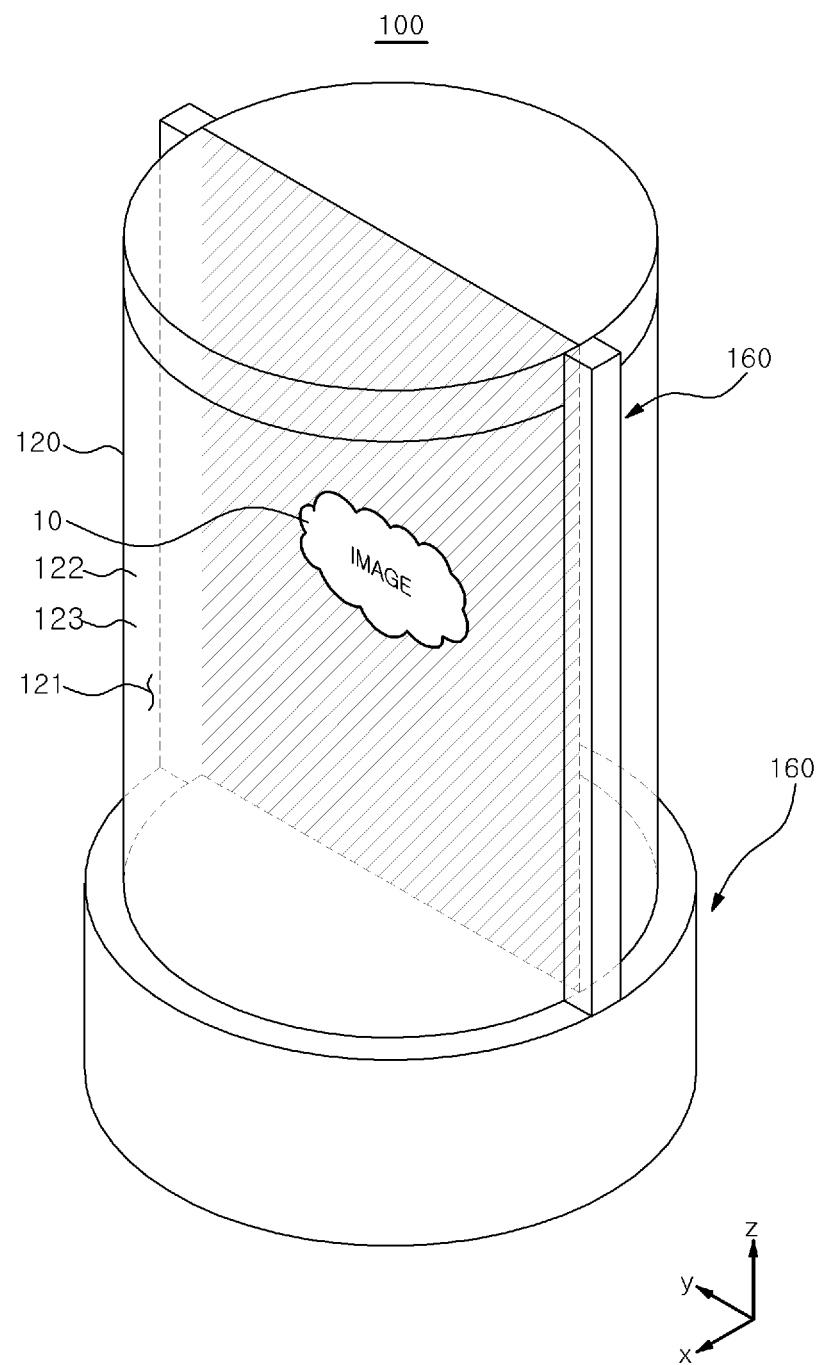
FIG. 1 is a perspective view of an appearance of a holographic image display device according to one embodiment.

FIG. 1 is a perspective view of art appearance of a holographic image display device according to one embodiment. However, since FIG. 1 is merely an example, the present disclosure is not limited to the holographic image display device illustrated in FIG. 1. In addition, the 3D coordinate axes (x, y, and z axes) shown in FIG. 1 are associated with the 2D coordinate axes shown in FIGS. 4 to 12.

The holographic image display device 100 may be a device that provides a pseudo hologram. Thus, the image 10 shown in FIG. 1 and the image 10 to be described below refer to a pseudo holographic image or a holographic image.

Referring to FIG. 1, the holographic image display device 100 includes a case 160 forming an appearance thereof and a spatial impression providing unit 120.

A power supply unit (not shown) and at least some components of an image display unit for displaying the image 10 are installed at the case 160. The power supply unit serves to supply power to the image display unit, an illuminance sensor unit or a control unit to be described later.

The case 160 is formed of a transparent or translucent material to allow an observer to see the inside of the case 160. Alternatively, the case 160 may be formed of an opaque material not to allow an observer to see the inside of the case 160.

The spatial impression providing unit 120 forms a space 121 surrounding the image 10. The space 121 may be formed by only the spatial impression providing unit 120 or by the spatial impression providing unit 120 and one end surface of the case 160 as illustrated in FIG. 1.

The spatial impression providing unit 120 is formed of a transparent material, and thus an external observer can recognize the image 10 displayed in the space 121 through the spatial impression providing unit 120. Here, when the image 10 is displayed in the space 121, this may be referred to as "the image is floated." In this case, the observer can recognize the image 10 in the form of a holographic image, that is, a stereoscopic image.

Meanwhile, the space 121 may be recognized as the background of the image 10 from an observer's point of view. Further, depending on the position of the observer, the space 121 may be recognized as a background having the same or similar brightness and color as the surroundings. However, if the space 121 is recognized brightly due to the bright illumination around the holographic image display device 100, the image 10 displayed in the background of the space 121 may not be clearly seen by the observer.

The present embodiment provides a technology in which the space 121 recognized as the background of the image 10 can be seen dark even if the ambient illumination is bright.

Hereinafter, a configuration of the holographic image display device 100 that provides such a technology will be described in detail.

Figure 2:
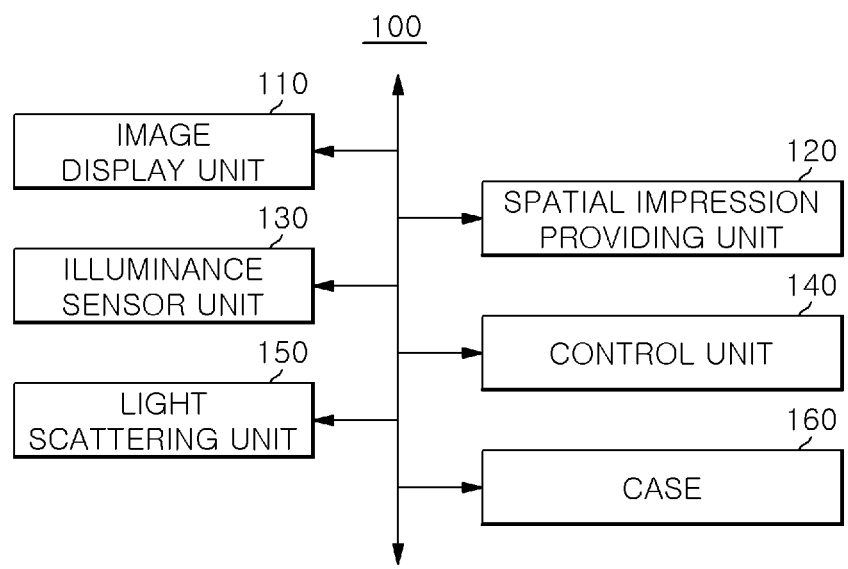
FIG. 2 is a diagram conceptually illustrating a configuration of the holographic image display device illustrated in FIG. 1.

FIG. 2 is a diagram conceptually illustrating a configuration of the holographic image display device illustrated in FIG. 1. FIG. 2 merely shows an example of the configuration of the holographic image display device, and the present disclosure is not limited to those shown in FIG. 2.

Referring to FIG. 2, the holographic image display device 100 includes an image display unit 110 and a spatial impression providing unit 120. In some embodiments, the holographic image display device 100 may further include at least one of an illuminance sensor unit 130, a control unit 140, a light scattering unit 150, and a case 160. Further, the holographic image display device 100 may further include other components that are not shown in the drawings.

First, the image 10 is displayed by the image display unit 110. As described above, the image 10 may be a pseudo holographic image referred to in the field of pseudo holograms as described above. The image display unit 110 includes a configuration for generating an image and a configuration for displaying an image, such as a projector or a liquid crystal panel. The holographic image display devices 100 implemented by various image display units 110 will be described in more detail with reference to FIGS. 4 to 12.

The spatial impression providing unit 120 forms a space 121 surrounding the image 10. The space 121 may be formed by only the spatial impression providing unit 120 or by the spatial impression providing unit 120 and one end surface of the case 160.

The spatial impression providing unit 120 is formed of a transparent material, and thus an external observer can visually recognize the image 10 displayed in the space 121 through the spatial impression providing unit 120. Here, when the image 10 is displayed in the space 121, this may be referred to as "the image is floated."

Meanwhile, the expression "the image 10 is displayed in the space 121" means that the space 121 is recognized as the background of the image 10 from an observer's point of view. In this case, the illuminance around the holographic image display device 100 may be reflected in the space 121 that is visually recognized as the background of the image by the observer. If the illuminance around the holographic image display device 100 is relatively higher than the brightness of the image 10, the observer 30 may not recognize the image 10 clearly.

According to one embodiment, the spatial impression providing unit 120 is formed of a transparent and colored material. Such a colored material includes colored acrylic, polycarbonate (PC), polymethyl methacrylate (PMMA) or the like having low light transmittance in the visible light region, but the present disclosure is not limited thereto. In addition, the light transmittance of the spatial impression providing unit 120 may be, e.g., 30% or less in the visible light region.

Accordingly, according to the present embodiment, since the space serving as the background of the image can be seen colored, the observer can clearly recognize the image even when the ambient illumination is bright.

Meanwhile, the spatial impression providing unit 120 comprises an anti-reflection coating member 122. The anti-reflective coating member 122 is applied to at least one of an inner surface (facing the image 10) or an outer surface (facing an observer) of the spatial impression providing unit 120. The anti-reflection coating member 122 prevents or suppresses the image 10 displayed by the image display unit 110 from being reflected from the inner surface of the spatial impression providing unit 120. Therefore, the phenomenon that a ghost image is visible to the observer can be reduced or eliminated. Meanwhile, according to one embodiment, the spatial impression providing unit 120 comprises a dynamic dye filter 123, and the dynamic dye filter 123 is applied to the inner surface or the outer surface of the spatial impression providing unit 120. When the spatial impression providing unit 120 is implemented by the dynamic dye filter 123, the degree of color of the spatial impression providing unit 120 may vary depending on the illuminance around the pseudo holographic image display device 100 and therefore the light transmittance may also vary. For example, when the ambient illuminance is increased, the degree of color of the spatial impression providing unit 120 implemented by the dynamic dye filter 123 is increased to lower the light transmittance, and vice versa.

The illuminance sensor unit 130 is disposed on an outer circumferential surface of the holographic image display device 100 to detect the illuminance around the holographic image display device 100. The illuminance sensor unit 130 may be configured as a sensor for calculating illuminance based on the brightness of light inputted thereto, and since the configuration itself is general, a description thereof will be omitted.

The control unit 140 receives an ambient illuminance from the illuminance sensor unit 130 and controls the luminance of the image 10 displayed by the image display unit 110 based on the received ambient illuminance. As described above, the spatial impression providing unit 120 comprises a colored transparent material, which decreases the light transmittance of the spatial impression space providing unit 120. In this case, the brightness in the space 121 is lowered due to the low light transmittance, but the brightness of the image 10 seen by the observer may also be lowered. Accordingly, the control unit 140 can control the luminance of the image display unit 110 to be high or low in consideration of the ambient illuminance to solve this problem. For example, if the ambient illuminance is higher than a predetermined reference value, the luminance of the image display unit 110 is controlled to be high, whereas if the ambient illuminance is lower than the predetermined reference value, the luminance of the image display unit 110 is controlled to be low. The control unit 140 may be implemented by a memory storing instructions programmed to perform such a function, and a microprocessor executing the instructions. In addition, the control unit 140 may perform various functions in addition to controlling the luminance of the image display unit 110.

The light scattering unit 150 scatters light incident on the image display unit 110. The light scattering unit 150 is disposed on the image display unit 110, and may be formed to include, e.g., acrylic beads or the like or may be formed by etching the surface thereof. The scattering angle of the light can be adjusted by the light scattering unit 150 to adjust the viewing angle of the image 10.

The case 160 forms an outer appearance of the holographic image display device 100. Since the case 160 has already been described with reference to FIG. 1, a detailed description thereof will be omitted.

As described above, according to one embodiment, since the space serving as the background of the image can be seen colored, the observer can clearly recognize the image even when the ambient illumination is bright. Further, the ghost phenomenon can be reduced or eliminated. In addition, it is possible to provide a pseudo holographic image with a wider viewing angle than in the conventional case.

Hereinafter, various embodiments of the holographic image display device will be described.

First, the image display unit 110 may be implemented in the form of a projector or a liquid crystal panel. FIGS. 3 to 9 illustrate cases where the image display unit 110 is implemented in the form of a projector, and FIG. 10 illustrates a case where the image display unit 110 is implemented in the form of a liquid crystal panel. The cases where the image display unit 110 is implemented in the form of a projector will be described first with reference to FIGS. 3 to 9.

Figure 3:
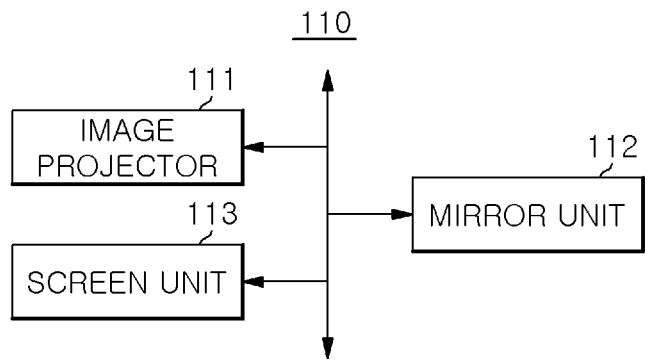
FIG. 3 is a diagram conceptually illustrating an example of a configuration of an image display unit illustrated in FIG. 2.

FIG. 3 is a diagram illustrating a configuration in which the image display unit 110 illustrated in FIG. 2 is implemented in the form of a projector. When the image display unit 110 is implemented in the form of a projector, the projector may be an ultra-short throw (UST) projector, but is not limited thereto.

Referring to FIG. 3, the image display unit 110 includes an image projector 111, a mirror unit 112, and a screen unit 113. The image projector 111 generates and projects the image 10, and includes RGB light sources as components. Since the image projector 111 itself is well known in the projector field, a detailed description thereof will be omitted.

The mirror unit 112 is configured to reflect the image 10 incident from the image projector 111 toward the screen unit 113 to be described later. The reflection angle of the mirror unit 112 can be controlled by the control unit 140. The mirror unit 112 may be implemented in the form of a mirror. Since the mirror unit 112 itself is well known in the field of projection projectors, a detailed description thereof will be omitted.

An image 10 is formed on the screen 113. The image 10 formed on the screen unit 113 may be an image 10 reflected from the mirror unit 112. The screen unit 113 may be a reflective type or a transmissive type, and may be formed of a transparent or semitransparent material. When the image 10 is input to the reflective screen 113, the image 10 is reflected toward the observer. On the other hand, when the image 10 is input to the transmissive screen 113, the image 10 is irradiated toward the observer after passing through the transmissive screen 113.

Figure 4:
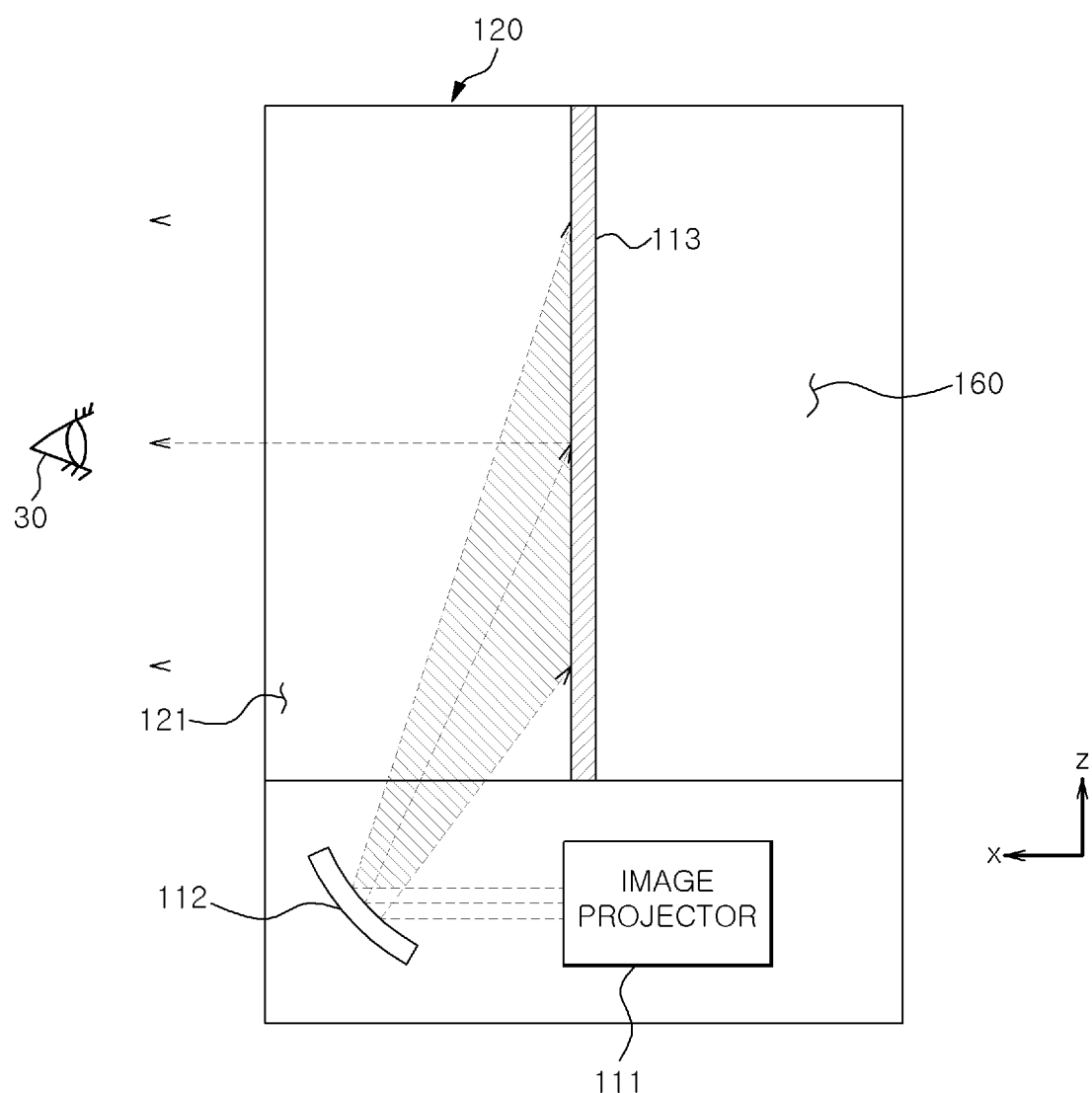
FIG. 4 is a cross-sectional view of a holographic image display device according to a first embodiment.

FIG. 4 is a side cross-sectional view of an image display unit 110 employing a reflective type screen unit 113 and a holographic image display device 100 including such an image display unit 110.

Referring to FIG. 4, the holographic image display device 100 includes an image display unit 110, a spatial impression providing unit 120, and a case 160. The image display unit 110 includes an image projector 111, a mirror unit 112, and a screen unit 113. The image projector 111 and the mirror unit 112 are disposed in a lower portion of the holographic image display device 100.

The image 10 projected from the image projector 111 is reflected by the mirror 112. The image 10 reflected by the mirror unit 112 reaches the reflective type screen unit 113 and is reflected by the screen unit 113 to be directed toward the observer 30.

The reflective type screen unit 113 illustrated in FIG. 4 includes a first surface and a second surface. The first surface is a surface which reflects the image 10, and the second surface is a surface to which light introduced from the outside is irradiated. This will be described in detail with reference to FIG. 5.

Figure 5:
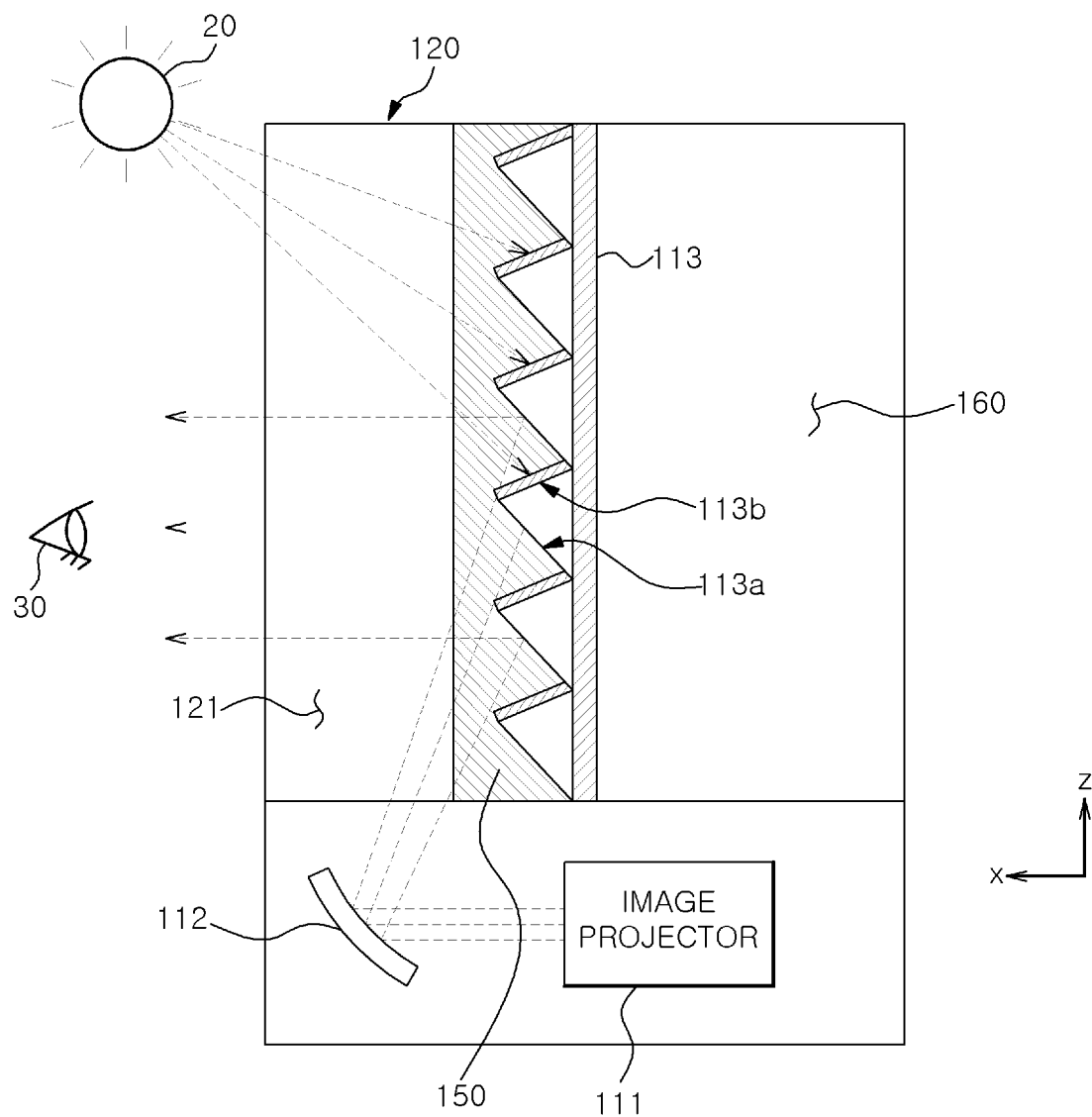
FIG. 5 is a diagram illustrating in detail components of the holographic image display device of FIG. 4.

FIG. 5 an enlarged cross-sectional view of the reflective type screen unit 113 in FIG. 4. However, the cross section of the screen unit 113 shown in FIG. 5 is illustrative purpose only.

Referring to FIG. 5, the reflective type screen unit 113 includes first surfaces 113a and second surfaces 113b. As illustrated, the first surfaces 113a and the second surfaces 113b are alternately formed on the screen unit 113. In addition, the first surface 113a and the second surface 113b are formed at a predetermined angle with each other.

The first surface 113a reflects the input image 10 reflected from the mirror unit 112 toward the observer 30. The first surface 113a may be one surface of a Fresnel lens or one surface of a prism array.

The second surface 113b is a surface on which an absorbing member for absorbing light introduced from external lighting 20, e.g., sunlight or artificial lighting, is disposed. Any kind of material may be employed as the absorbing member as long as the material can absorb light. When the light from the outside is absorbed by the second surface 113b, the brightness of the space 121 becomes lower, and thus the image 10 can be more clearly seen by the observer 30.

Meanwhile, as shown in FIG. 5, the light scattering unit 150 is disposed on the screen unit 113. The light scattering unit 150 is configured to scatter light. The light scattering unit 150 may be formed to have, e.g., acrylic beads or may be formed by etching the surface thereof. The scattering angle of the light can be adjusted by the light scattering unit 150 to adjust the viewing angle of the image 10.

Figure 6:
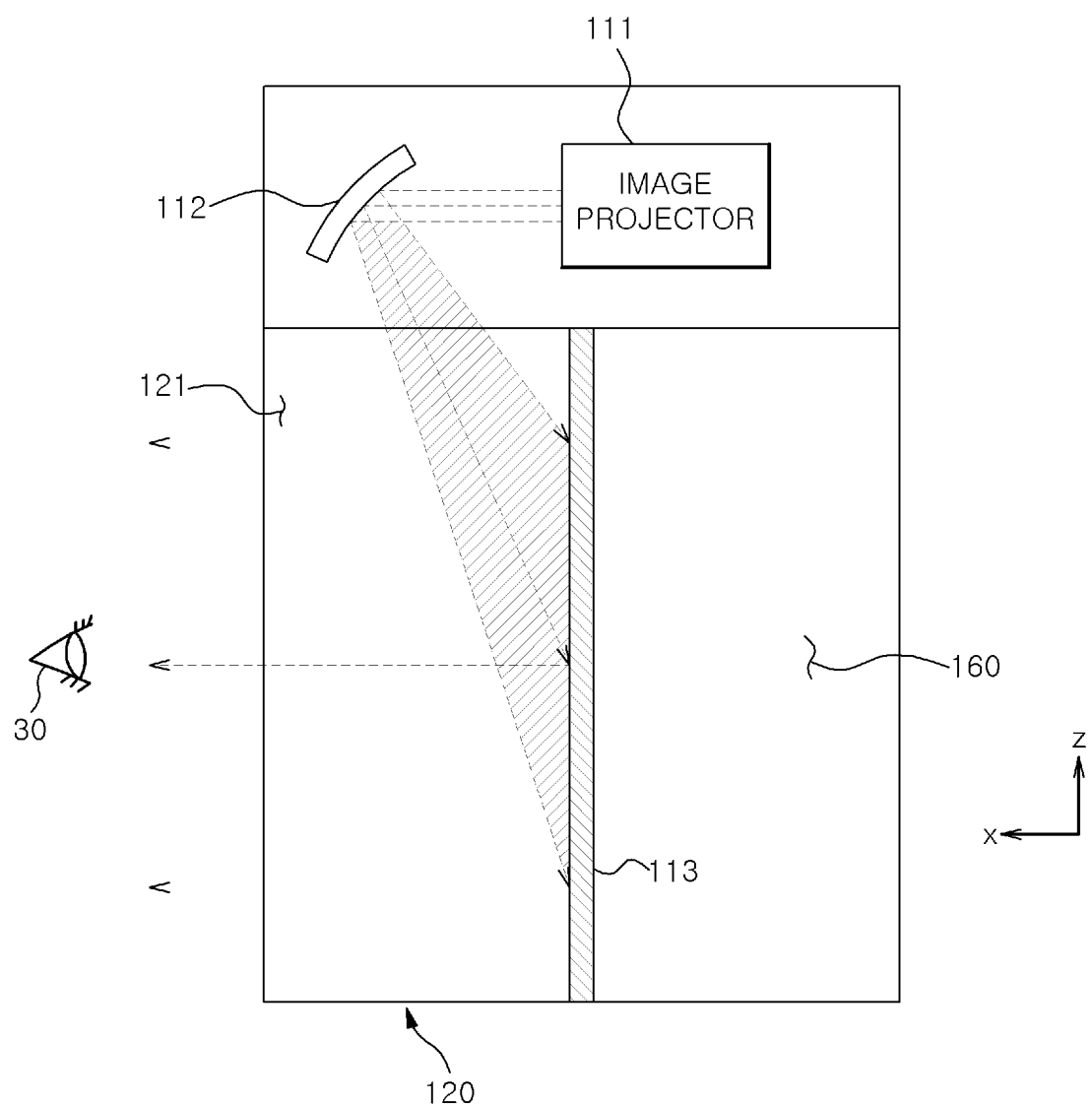
FIG. 6 is cross-sectional view of a holographic image display device according to a second embodiment.

FIG. 6 is a side cross-sectional view of the holographic image display device 100 in a case where the image projector 111 and the mirror portion 112 are disposed in an upper portion of the holographic image display device 100 unlike FIG. 4. Here, since the other configurations of the holographic image display device 100 except for the arrangement of the image projector 111 and the mirror 112 are the same as those of the holographic image display device 100 shown in FIG. 4, a redundant description thereof will be omitted.

Figure 7:
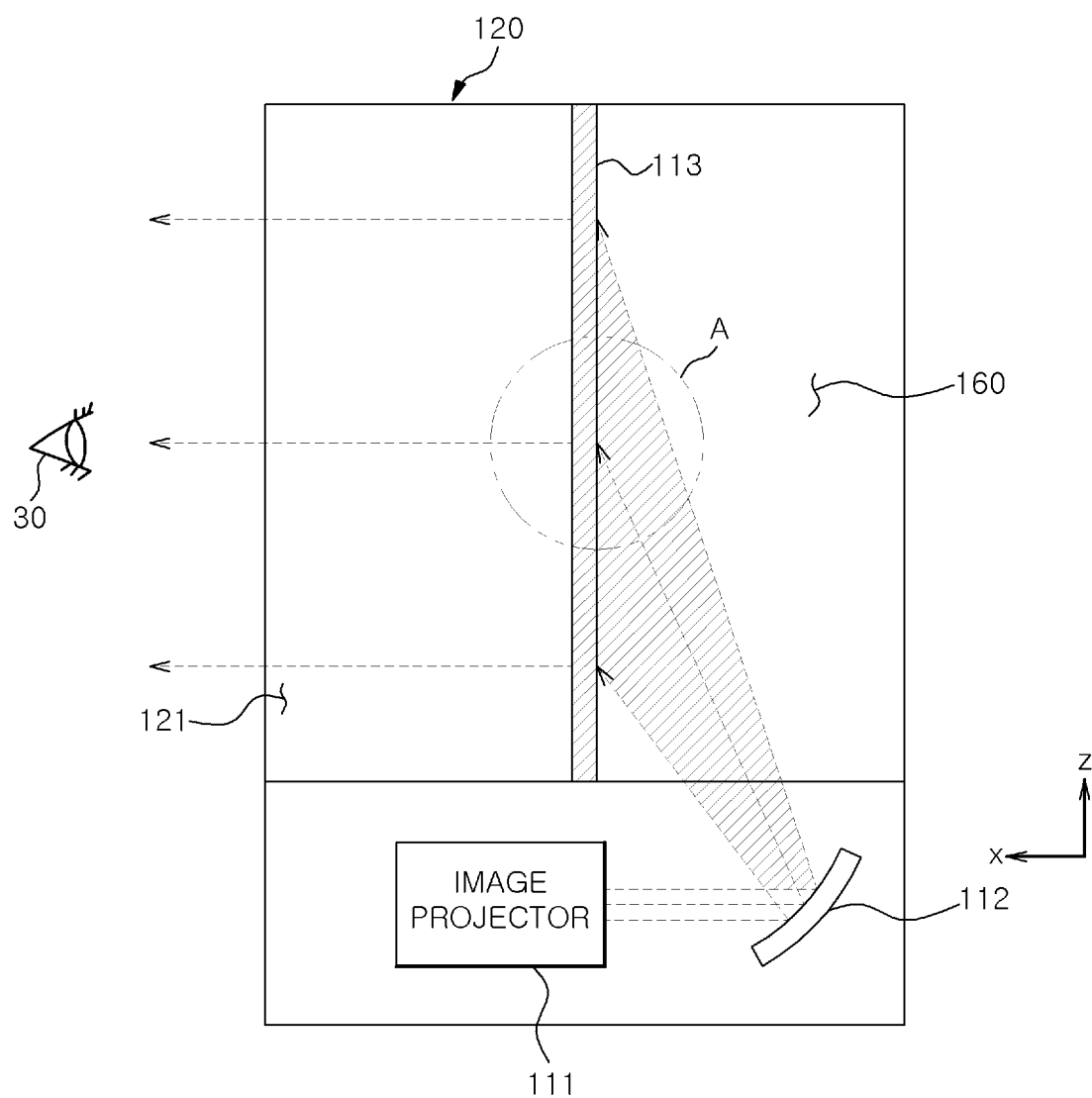
FIG. 7 is a cross-sectional view of a holographic image display device according to a third embodiment.

FIG. 7 is a side cross-sectional view of the holographic image display device 100 including the image display unit 110 employing the transmissive type screen unit 113, unlike FIGS. 4 to 6.

Referring to FIG. 7, the holographic image display device 100 includes an image display unit 110, a spatial impression providing unit 120, or a case 160. The image display unit 110 includes an image projector 111, a mirror unit 112, and a screen unit 113. The image projector 111 and the mirror unit 112 are disposed in a lower portion of the holographic image display device 100.

The image 10 projected from the image projector 111 is reflected by the mirror 112. The image 10 reflected by the mirror unit 112 reaches the transmissive type screen unit 113 and transmits through the screen unit 113 to be directed toward the observer 30. Here, the image 10 transmitting through the screen unit 113 passes through the space 121 to be directed toward the observer 30.

Figure 8:
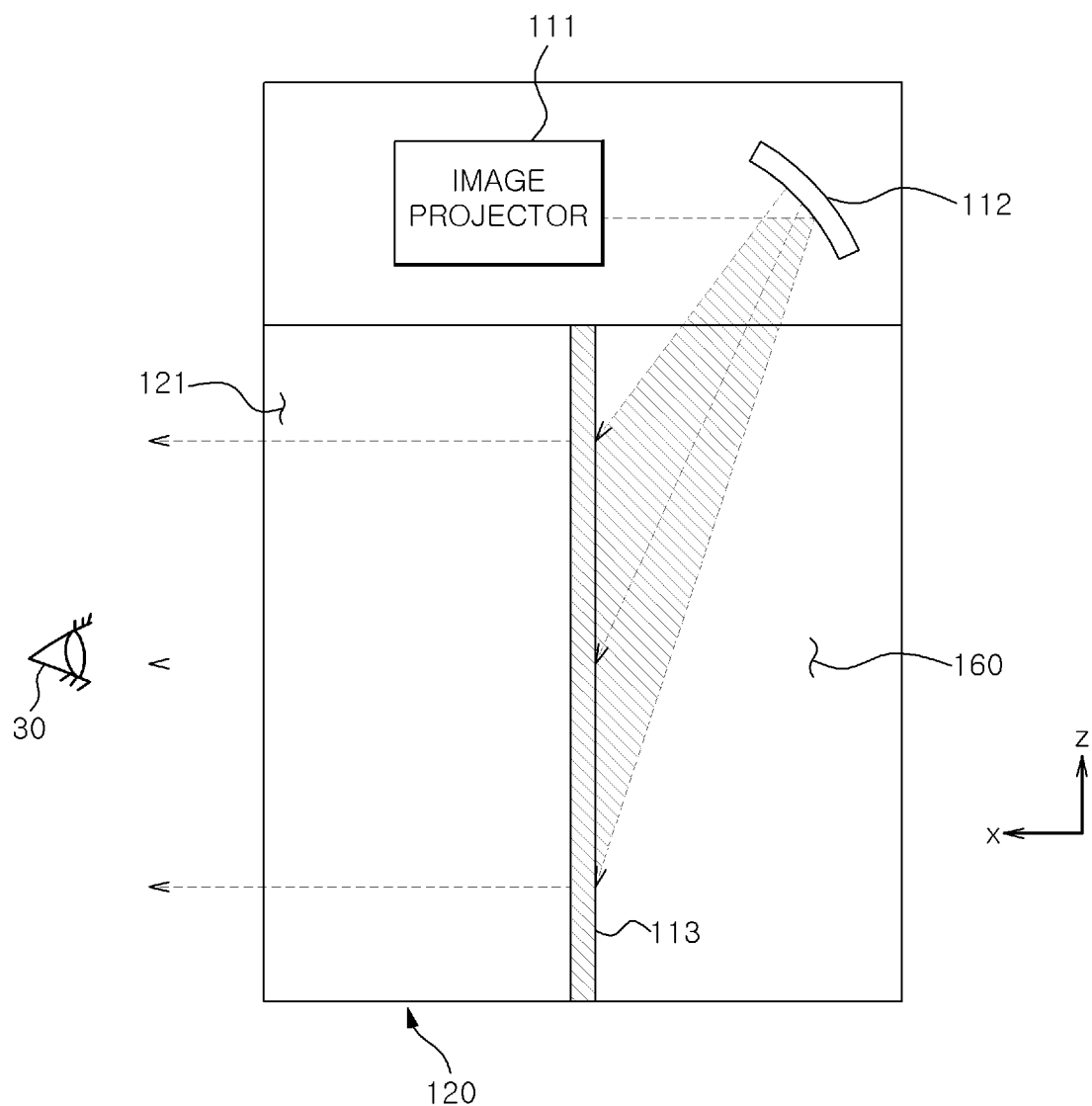
FIG. 8 is a cross-sectional view of a holographic image display device according to a fourth embodiment.

FIG. 8 is a side cross-sectional view of the holographic image display device 100 in a case where the image projector 111 and the mirror portion 112 are disposed in an upper portion of the holographic image display device 100 unlike FIG. 7. Here, since the other configurations of the holographic image display device 100 except for the arrangement of the image projector 111 and the mirror 112 are the same as those of the holographic image display device 100 shown in FIG. 7, a redundant description thereof will be omitted.

Figure 9:
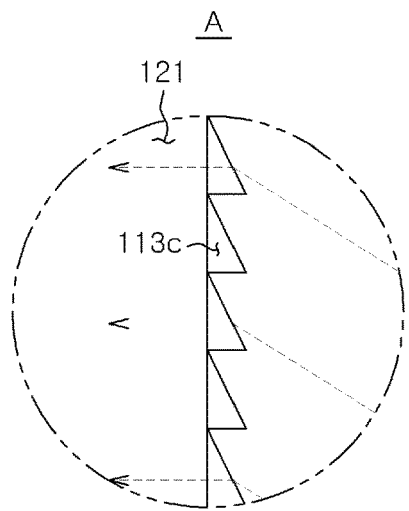
FIG. 9 is a diagram illustrating an example of a cross section of a screen unit illustrated in FIG. 7.
Figure 10:
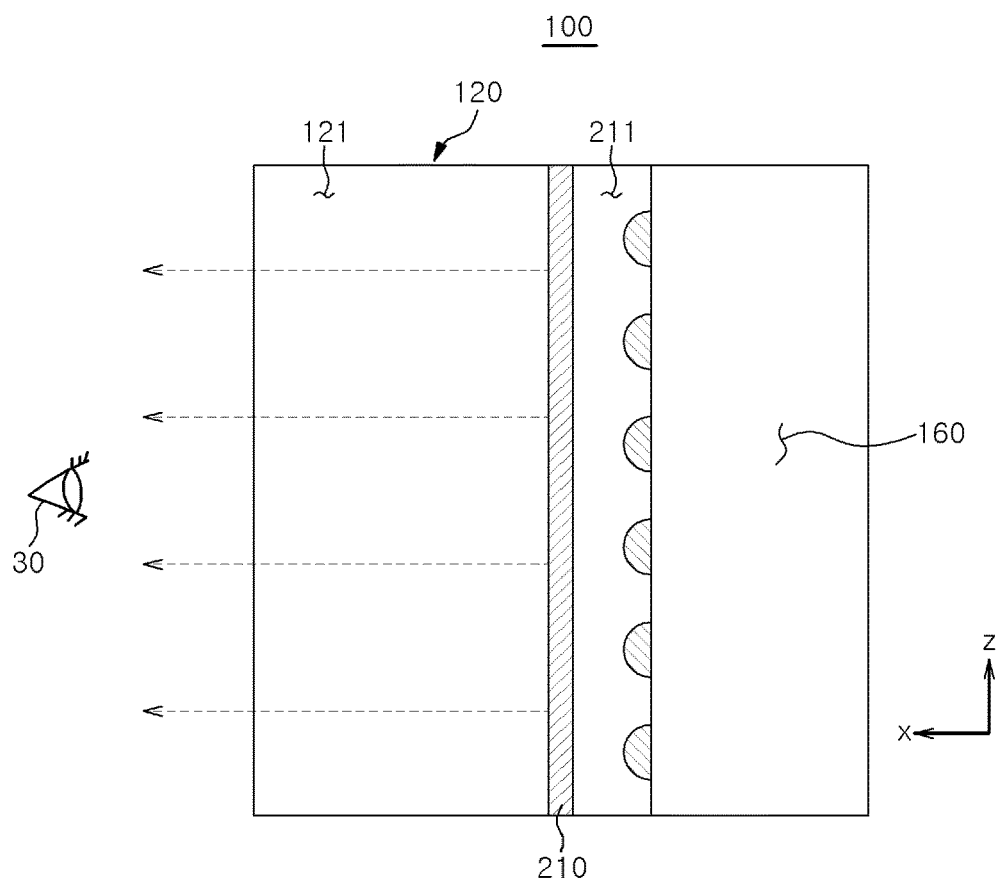
FIG. 10 is a cross-sectional view of a holographic image display device according to a fifth embodiment.

FIG. 9 is an enlarged view of a portion "A" in the transmissive screen unit 113 illustrated in FIG. 7. Referring to FIG. 9, the transmissive screen unit 113 is formed in the form of a prism 113c. When the image 10 is inputted to the transmissive screen unit 113 from the mirror unit 112, the image 10 transmits through the transmissive screen unit 113 in the form of the prism 113c to be directed toward the observer 30.

Meanwhile, FIG. 10 is a side cross-sectional view of the holographic image display device 100 including an image display unit implemented in the form of a liquid crystal panel, unlike FIGS. 3 to 9. Referring to FIG. 10, the holographic image display device 100 includes an image display unit 210, 211 and a spatial impression providing unit 120. In some embodiments, the holographic image display device 100 further includes an illuminance sensor unit, a control unit (not shown), or a case 160. The spatial impression providing unit 120, the illuminance sensor unit, the control unit or the case 160 are the same as those shown in FIG. 2, descriptions thereof will be omitted.

The image display unit 210, 211 includes a panel 210 for displaying a holographic image, and a backlight unit (BLU) 211 for providing a backlight to the panel 210. Here, the backlight unit 211 may be a direct LED BLU. When using the backlight unit 211 of the direct LED BLU, it is possible to provide a backlight with a brighter brightness. Therefore, even if the spatial impression providing unit 120 includes a colored transparent material and has a low light transmittance, the image 10 can have brightness sufficient to allow the observer 30 to clearly recognize the image 10.

Figure 11:
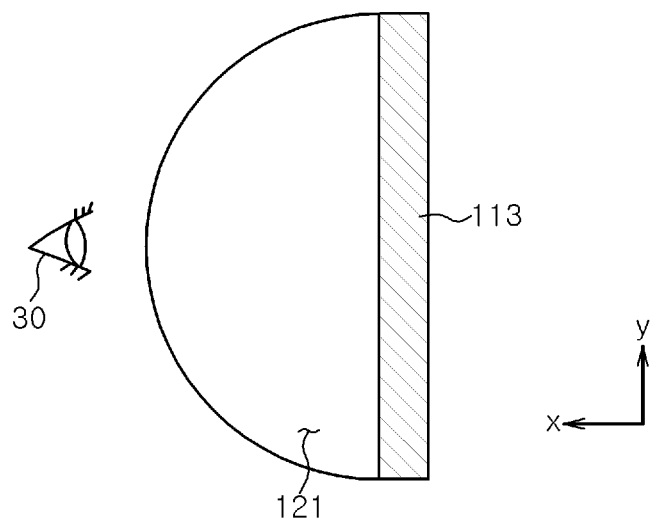
FIG. 11 is a longitudinal cross-sectional view of a holographic image display device according to one modified embodiment.
Figure 12:
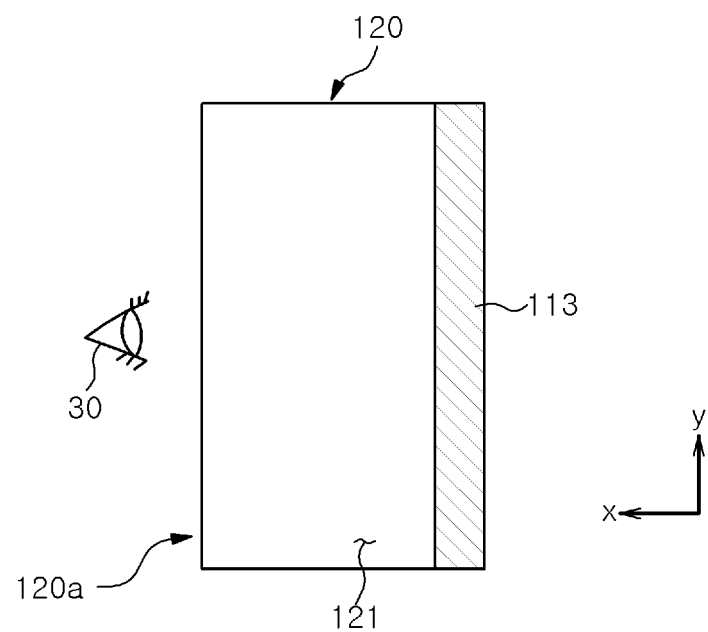
FIG. 12 is a longitudinal cross-sectional view of a holographic image display device according to another modified embodiment.

FIGS. 11 and 12 are cross-sectional views of the holographic image display device 100 employing various types of spatial impression providing units 120. Referring to FIGS. 11 and 12, the spatial impression providing unit 120 has a hemispherical shape or a cubic shape, and may be elliptical unlike those shown in FIGS. 11 and 12 without being limited thereto.

As shown in FIG. 11, when the spatial impression providing unit 120 has the hemispherical shape, the image 10 can be observed in any direction of the spatial impression providing unit 120. Therefore, in this case, the image display unit 110 can determine the luminance of the image 10 under the premise that the image 10 can be observed in all directions of the spatial impression providing unit 120.

On the other hand, as shown in FIG. 12, when the spatial impression providing unit 120 has the cubic shape, the image 10 can be seen through only one surface 120a of the spatial impression providing unit 120. Therefore, in this case, the image display unit 110 can determine the luminance of the image 10 under the premise that the image 10 can be observed on only one surface 120a of the spatial impression providing unit 120. When the holographic image display device 100 shown in each of FIGS. 11 and 12 includes the screen unit 113 having the same diameter and provides the image 10 having the same luminance, the power of the image display unit 110 should be greater in FIG. 11 than in FIG. 12. This is because the image 10 needs to be observed from all sides in the case of FIG. 11, while the image 10 needs to be observed only from one side 120a in the case of in FIG. 12.

As described above, according to one embodiment, since the space serving as the background of the image can be seen colored, the observer can clearly recognize the image even when the ambient illumination is bright. Further, the ghost phenomenon can be reduced or eliminated. In addition, it is possible to provide a pseudo holographic image with a wider viewing angle than in the conventional case.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

INDUSTRIAL APPLICABILITY

In accordance with the embodiments of the present disclosure, the holographic image can be more clearly provided to the observer, and the ghost phenomenon can be reduced or eliminated. In addition, it is possible to provide a pseudo holographic image with a wider viewing angle than in the conventional case.

What is claimed is:

1. A holographic image display device comprising:
an image display unit configured to display a holographic image; and
a spatial impression providing unit configured to form a space surrounding the holographic image, the spatial impression providing unit comprising a colored transparent material which allows the holographic image to be seen through the spatial impression providing unit from outside while allowing the space to be seen colored,
wherein the spatial impression providing unit comprises a dynamic dye filter, and a degree of color of the dynamic dye filter varies depending on an ambient illuminance.

2. The holographic image display device of claim 1, wherein the image display unit includes:
an image projector configured to project the holographic image; and
a screen unit including a first surface which reflects the holographic image projected thereto toward the outside and a second surface on which an absorbing member for absorbing light introduced from the outside is disposed.

3. The holographic image display device of claim 2, wherein the first surface is formed of a plurality of Fresnel lenses or a plurality of prisms.

4. The holographic image display device of claim 1, wherein the image display unit includes:
a panel for displaying the holographic image; and
a backlight unit for providing a backlight to the panel.

5. The holographic image display device of claim 1, wherein the spatial impression providing unit comprises an anti-reflection coating member.

6. The holographic image display device of claim 1, wherein the spatial impression providing unit has a light transmittance of 30% or less.

7. The holographic image display device of claim 1, further comprising an illuminance sensor unit configured to detect an illuminance around the holographic image display device, wherein a luminance of the image display unit that displays the holographic image varies depending on the illuminance detected by the illuminance sensor unit.

8. The holographic image display device of claim 1, further comprising a light scattering unit disposed on the image display unit to scatter the holographic image displayed by the image display unit.

9. The holographic image display device of claim 2, wherein the image display unit further includes a mirror unit configured to reflect the holographic image projected from the image projector toward the screen unit.

* * * * *